US009296002B2

(12) United States Patent
Zwahlen et al.

(10) Patent No.: US 9,296,002 B2
(45) Date of Patent: Mar. 29, 2016

(54) WEARABLE SPRAYING DEVICE

(71) Applicants: Jürg Zwahlen, Triesen (LI); Claudio Carrozza, Kleinandelfingen (CH); Michael Zaugg, Aarburg (CH)

(72) Inventors: Jürg Zwahlen, Triesen (LI); Claudio Carrozza, Kleinandelfingen (CH); Michael Zaugg, Aarburg (CH)

(73) Assignee: Birchmeier Sprühtechnik, Stetten (CH)

( * ) Notice: Subject to any disclaimer, the term of this patent is extended or adjusted under 35 U.S.C. 154(b) by 0 days.

(21) Appl. No.: 14/399,154

(22) PCT Filed: Apr. 25, 2013

(86) PCT No.: PCT/IB2013/053268
§ 371 (c)(1),
(2) Date: Nov. 5, 2014

(87) PCT Pub. No.: WO2013/168040
PCT Pub. Date: Nov. 14, 2013

(65) Prior Publication Data
US 2015/0122914 A1      May 7, 2015

(30) Foreign Application Priority Data

May 7, 2012   (CH) .......................... 630/12

(51) Int. Cl.
*B05B 11/00*   (2006.01)
*A01M 7/00*    (2006.01)
(Continued)

(52) U.S. Cl.
CPC ........... *B05B 11/3009* (2013.01); *A01C 23/047* (2013.01); *A01M 7/0017* (2013.01); *B05B 9/0805* (2013.01); *B05B 9/0877* (2013.01); *B05B 11/3004* (2013.01)

(58) Field of Classification Search
CPC ............ B05B 11/3004; B05B 11/3009; B05B 11/3014; B05B 11/3015; B05B 11/3011; B05B 9/0877
USPC .......... 239/154, 373, 349, 360; 222/175, 538, 222/533, 469, 465.1, 470, 472
See application file for complete search history.

(56) References Cited

U.S. PATENT DOCUMENTS

| 1,356,657 A | * | 10/1920 | Phister | ................. A62C 11/005 222/175 |
| 4,411,387 A | * | 10/1983 | Stern | .................... B05B 11/3015 239/345 |
| 4,768,714 A | * | 9/1988 | Luchsinger | ......... A01M 7/0017 222/175 |

(Continued)

FOREIGN PATENT DOCUMENTS

WO    9702899 A1    1/1997
WO    2012045402 A1    4/2012

*Primary Examiner* — Arthur O Hall
*Assistant Examiner* — Joseph A Greenlund
(74) *Attorney, Agent, or Firm* — Seed IP Law Group PLLC

(57) ABSTRACT

A sprayer portable on the back for spraying liquids comprises a tank (2), a hand lever (4), a pump (12) and a pressure vessel, wherein the pressure vessel is formed by a hollow space in the hand lever (4) and the pump (12) is arranged in the hollow space. The piston rod (13) of the pump is rotatably connected to a lever element (15) of the hand lever. A connecting sleeve (16) for a hose with a spray nozzle is integrated in the hand lever. The compact configuration of the sprayer allows a larger tank volume and more convenient operation. The sprayer can be manufactured at low cost due to the small number of components.

12 Claims, 4 Drawing Sheets

(51) Int. Cl.
  *B05B 9/08*   (2006.01)
  *A01C 23/04*  (2006.01)

(56)     References Cited

U.S. PATENT DOCUMENTS

| | | | | |
|---|---|---|---|---|
| 5,335,853 | A * | 8/1994 | Wirz | B05B 9/0877 |
| | | | | 222/175 |
| 5,561,901 | A * | 10/1996 | Stahley | B05B 11/0064 |
| | | | | 239/333 |
| 5,636,791 | A * | 6/1997 | Leer | B05B 9/0877 |
| | | | | 239/142 |
| 5,755,361 | A * | 5/1998 | Restive | B05B 9/0883 |
| | | | | 222/209 |
| 5,938,116 | A | 8/1999 | Restive et al. | |
| 6,412,707 | B1 * | 7/2002 | Wirz | B05B 9/0877 |
| | | | | 222/175 |
| 6,769,628 | B1 * | 8/2004 | Vaage | B05B 7/2427 |
| | | | | 239/152 |
| 7,556,179 | B2 * | 7/2009 | Yang | B05B 11/0056 |
| | | | | 222/1 |
| 2006/0261181 | A1 * | 11/2006 | Wirz | B05B 9/0877 |
| | | | | 239/146 |
| 2015/0122914 | A1 * | 5/2015 | Zwahlen | A01M 7/0017 |
| | | | | 239/373 |

* cited by examiner

WEARABLE SPRAYING DEVICE

REFERENCE TO RELATED APPLICATIONS

This application is the U.S. national phase entry of International Patent Application no. PCT/IB2013/053268, filed Apr. 25, 2013, which claims priority to Swiss patent application no. 0630/21, filed May 7, 2012.

BACKGROUND OF THE INVENTION

The invention relates to a portable sprayer for spraying a liquid by using a pump that can be operated by hand.

DESCRIPTION OF THE PRIOR ART

Portable sprayers, especially devices that can be carried on the back, have been known for many decades. They allow application by spraying liquids such as water, fertilizers and pesticides, detergents or other liquids and liquid mixtures in the area of gardening and plantation cultivation as well as applications in industry, hygiene and the household.

Such devices comprise a tank as a reservoir of the spraying liquid, a pressure vessel and a hose with a lance or nozzle for spraying the liquid in a targeted manner. An entire device can be transported on the back for example by means of carrying straps affixed to the tank. A pump can be actuated by manual movement of a lever, so that liquid is sucked from the tank to the pump and is conducted from there under pressure to the pressure vessel, wherein the liquid also reaches the hose. A manual actuation of a valve at the end of the hose triggers the spraying of the liquid via a nozzle or lance at the desired point in time. The pressure vessel is arranged in known devices either in the tank itself or outside of the tank.

A portable spraying device has been disclosed in U.S. Pat. No. 6,412,707 for example. A pressure vessel is arranged there centrally within the tank, wherein the pump is affixed beneath the tank. The device comprises a bellows, in particular at the bottom end of the pump, which bellows forms a container for retaining leakages of liquid from the pump cylinder. The piston of the pump is moved by means of a hand lever attached laterally to the tank, in that a horizontally extending transverse rod is rotated about its longitudinal axis by the hand lever and the piston is moved in a reciprocating fashion by means of a toggle lever and rod.

U.S. Pat. No. 5,938,116 discloses a portable sprayer with a tank, a pump arranged in the tank and a hose with a valve and nozzle. When the pump is actuated by means of a hand lever, the liquid is sucked at first into a pump cylinder and then pressed into an elastic container in the hose. The pressurized liquid can then be sprayed by a nozzle at the end of the elastic container.

DESCRIPTION OF THE INVENTION

A portable sprayer for spraying liquids is disclosed, comprising a tank which is used as a reservoir for the liquid, a pump that can be actuated by a hand lever, wherein the hand lever is rotatable about a hinge pin. The sprayer further comprises a pressure vessel for accommodating pressurized liquid and a hose with a valve and a nozzle or lance for spraying pressurized liquid.

In accordance with the invention and the independent claim, the hand lever of the sprayer comprises a hollow space with an opening, wherein the pump is arranged with a pump cylinder, a piston and a piston rod in the hollow space of the hand lever. The pump cylinder of the pump and the opening of the hand lever can be closed off in a sealed fashion. The pressure vessel is formed by the hollow space, the pump cylinder and a closure device above the opening. The piston rod is rotatably connected via a link joint to the tank or a pedestal apparatus of the sprayer.

The sprayer in accordance with the invention is especially characterized by the integration of the pressure vessel and the pump in the hand lever itself, in that these three elements form a compact unit. The piston rod only moves during operation of the sprayer in accordance with the invention by rotating about the axis of the link joint. During the operation of the pump by means of the hand lever on the other hand, the pressure vessel moves together with the pump cylinder relative to the piston rod and the piston.

The sealing closure of the opening of the hollow space of the hand lever and the pump to the exterior is realized in one embodiment by a removable closure device. It allows dismounting the pump merely by removing the closure device without the help of tools for the purpose of servicing the pump such as cleaning, removal of deposits or the exchange of parts. In one embodiment, the closure device comprises a closing device with a thread or a snap lock.

In a further embodiment of the invention, a connecting sleeve for the hose with the spray nozzle is arranged as a part of the hand lever. A hose can thus be affixed directly to the hand lever. The integration of the connecting sleeve on the hand lever allows a more convenient use in that the hose only extends from the hand lever on the side of the user up to the spray lance and as such is only situated in front of the user. It is thus prevented that a part of the hose extends from the rear side of the device to the front and can thus get caught in bushes or other objects.

In a further embodiment, the piston rod is formed having a hollow space and forms as such a suction line for the liquid from the tank to the pump cylinder. A feed line leads from the tank to the end of the hollow piston rod which faces the link joint. The piston rod comprises one or several openings at the end facing the piston, via which the liquid can reach the pump cylinder.

In one embodiment of the invention, the pump comprises a bellows for static sealing to the exterior, which bellows is fixed by means of the closure device to the opening of the hollow space. Since the bellows is adjustable with respect to its shape, reliable sealing is achieved during the entire pumping movement. Furthermore, this type of sealing, e.g. in contrast to an O-ring for sealing a piston rod leadthrough, is less susceptible to wear and tear or foreign bodies which could be deposited from the liquid.

In the region of an opening in the pump cylinder towards the hollow space, the pump comprises a non-return valve as a return flow barrier, which opens and closes as a result of the pressure difference between the pressure vessel and the pump. The piston of the pump is arranged for this purpose in one embodiment with two lips, wherein a freely movable O-ring is arranged between the lips. The piston lips together with the O-ring allow the extraction by suction of the liquid from the tank to the pump cylinder and the delivery of the liquid under pressure to the hollow space of the hand lever. They ensure further that no liquid will flow back when the liquid is pressed out into the pressure vessel.

In a further embodiment, the piston comprises a flap, membrane or ball check valve on the face side as a return flow barrier, wherein an O-ring is fixedly arranged in an annular groove on the piston.

In one embodiment of the invention, the entire hand lever can be removed from the hinge pin and can be fixed in a horizontal position and also in a vertical position, parallel to the tank. The lever thus comprises a snap-on hook for fixing to the hinge pin for example, wherein a receiving device is arranged on the hinge pin into which the snap-on hook can engage. This allows flexibility in the actuation of the pump in that the users of the device can freely choose the initial position of the hand lever, i.e. the position of the start of the suction function. It allows actuating the pump on the one hand from the horizontal position of the hand lever while the device is carried on the back. On the other hand, an actuation commencing from the vertical position is also possible while the device is deposited in an upright position for example. Furthermore, the device can be stored properly with vertical fixing of the hand lever.

Further features and advantages of the invention are provided in the dependent claims and the description below, in which the invention is explained in closer detail by reference to an embodiment shown in the schematic drawings.

BRIEF DESCRIPTION OF THE DRAWINGS

FIG. 2b shows the hand lever and the pump in a horizontal position in which the piston is situated at the end of the pump cylinder directly on the non-return valve; FIG. 2c shows the hand lever and the pump in a position that is higher in comparison with FIG. 2b, in which the piston is spaced from the non-return valve;

The same reference numerals are respectively used for the same elements in the drawings and explanations made for the first time relate to all drawings, unless expressly stated otherwise.

DETAILED DESCRIPTION OF THE PREFERRED EMBODIMENT OF THE INVENTION

Figure 1:
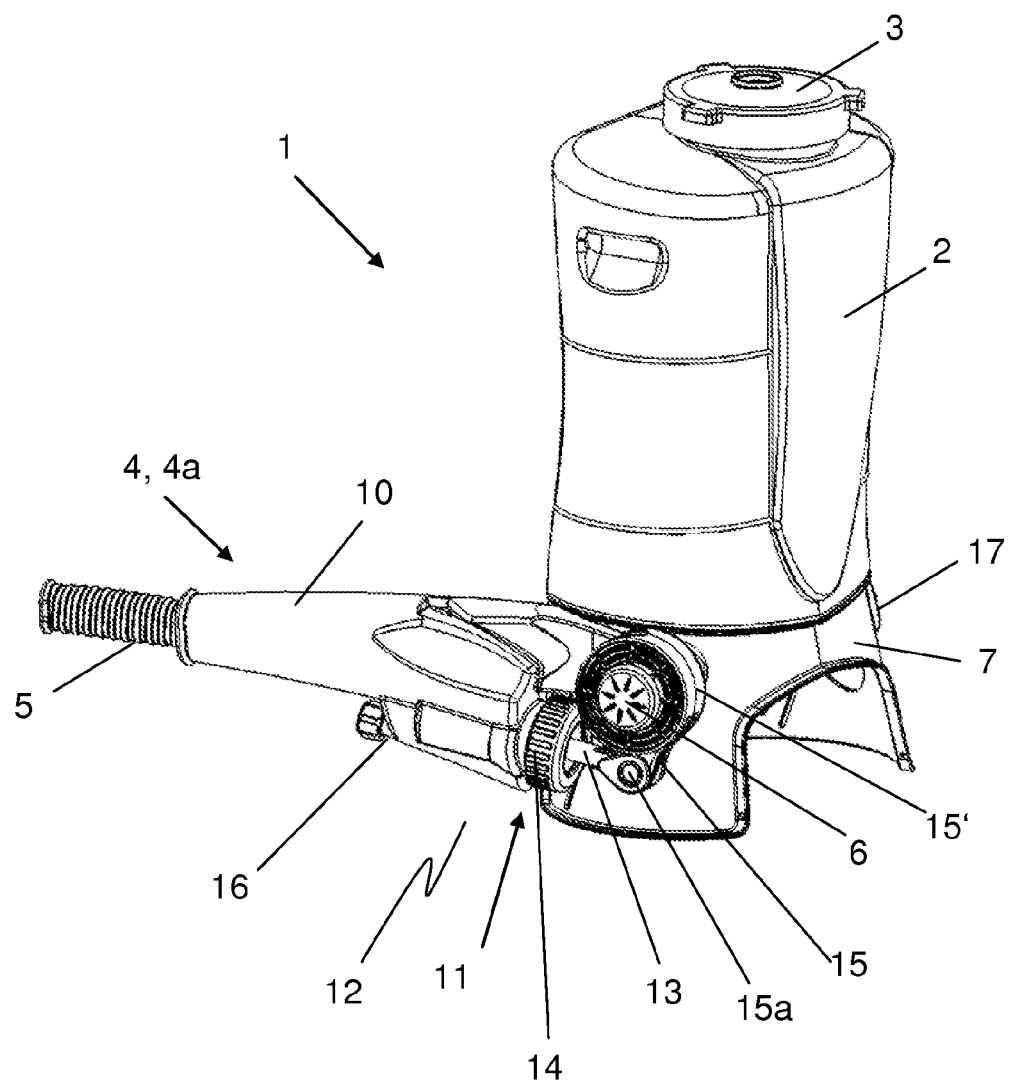
FIG. 1 shows an overall view of the portable sprayer in accordance with the invention, comprising a pressure vessel integrated in the hand lever and a pump.

FIG. 1 shows a portable sprayer 1 in accordance with the invention the spraying a liquid. It comprises a tank 2 which is used as a storage volume for the liquid and can be filled or discharged via an opening at the upper end of the tank 2 which is provided with a closure 3. An elongated hand lever 4 with a handle 5 is arranged on the side of the tank 2, which lever is rotatably fixed via a hinge pin 6 in the bottom region of the tank 2. A pedestal apparatus 7, which is provided with a hollow and light configuration, allows upright positioning of the device 1. The entire device can be carried on the back by means of carrying straps (not shown), wherein the tank 2 has an ergonomic shape adjusted to the back.

The hand lever 4 of the sprayer in accordance with the invention comprises a hollow body 10 and an opening 11 facing the hinge pin 6 of the hand lever. A pump 12 is arranged in the inner space of the hollow body of the hand lever, wherein a pump cylinder 20 with piston rests in the inner space of the hollow body and a piston rod 13 extends from the pump cylinder 20 beyond the opening 11. The piston rod 13 is connected via a lever element 15 to the hinge pin 6 of the hand lever 4. The opening 11 can be closed in a sealing manner by a closure device 14, wherein a recess in the closure device allows a movement of the piston rod 13 through the closure device 14. The hollow body 10 forms a volume together with the closure device 14 and the pump cylinder 20, which volume is used as a pressure vessel of the sprayer.

A connecting sleeve 16 is integrated in the hand lever 4, which connecting sleeve is in connection with the hollow body 10 at one end and at whose other end a hose (not shown) with valve and nozzle can be connected for the spraying of liquid.

The hand lever 4 thus integrates the hand lever, the pressure vessel, the receiver of the pump and the connecting sleeve for the hose in a single element. The entire hand lever can be made as such of a single part of plastic. Furthermore, the integration of several elements in the hand lever allows simplified and efficient assembly.

The individual parts of the pump 12 and its functionality are explained by reference to FIGS. 2a to 2c. The pump 12 comprises a pump cylinder 20 and a piston 21 which is connected to the piston rod 13. The piston rod is rotatably connected via a link joint 15a to a static element 15, wherein the static element 15 comprises a disc 15' which is fixed to the pedestal apparatus 7. Said element 15 and the disc 15' do not move during actuation of the hand lever. The cylinder 20 is arranged in the opening 11 of the hand lever 4 and protrudes into the hollow space 10 of the lever 4 which forms the pressure vessel 10. The cylinder 20 is connected to the pressure vessel 10 at its cylinder end 27 via an opening 22 by means of a non-return valve, e.g. a ball check valve 23 or a membrane. A closure device 14 seals both the pumps cylinder 20 and also the opening 11 and thus the hollow space and the pressure vessel 10 of the device. The closure device 14 comprises an opening, through which the piston rod 13 is guided into the cylinder 20. A bellows 24 seals the inner space of the cylinder 20 and thus the hollow space 10 towards the exterior. The piston rod 13 is provided with a hollow configuration along its entire length and comprises at its end facing the link joint 15a an opening and a connection for a suction line (not shown) from the tank 2. At its end situated in the cylinder 20 it comprises one or several outlet openings 25 through which the sucked-in liquid can reach the cylinder 20.

Figure 2A:
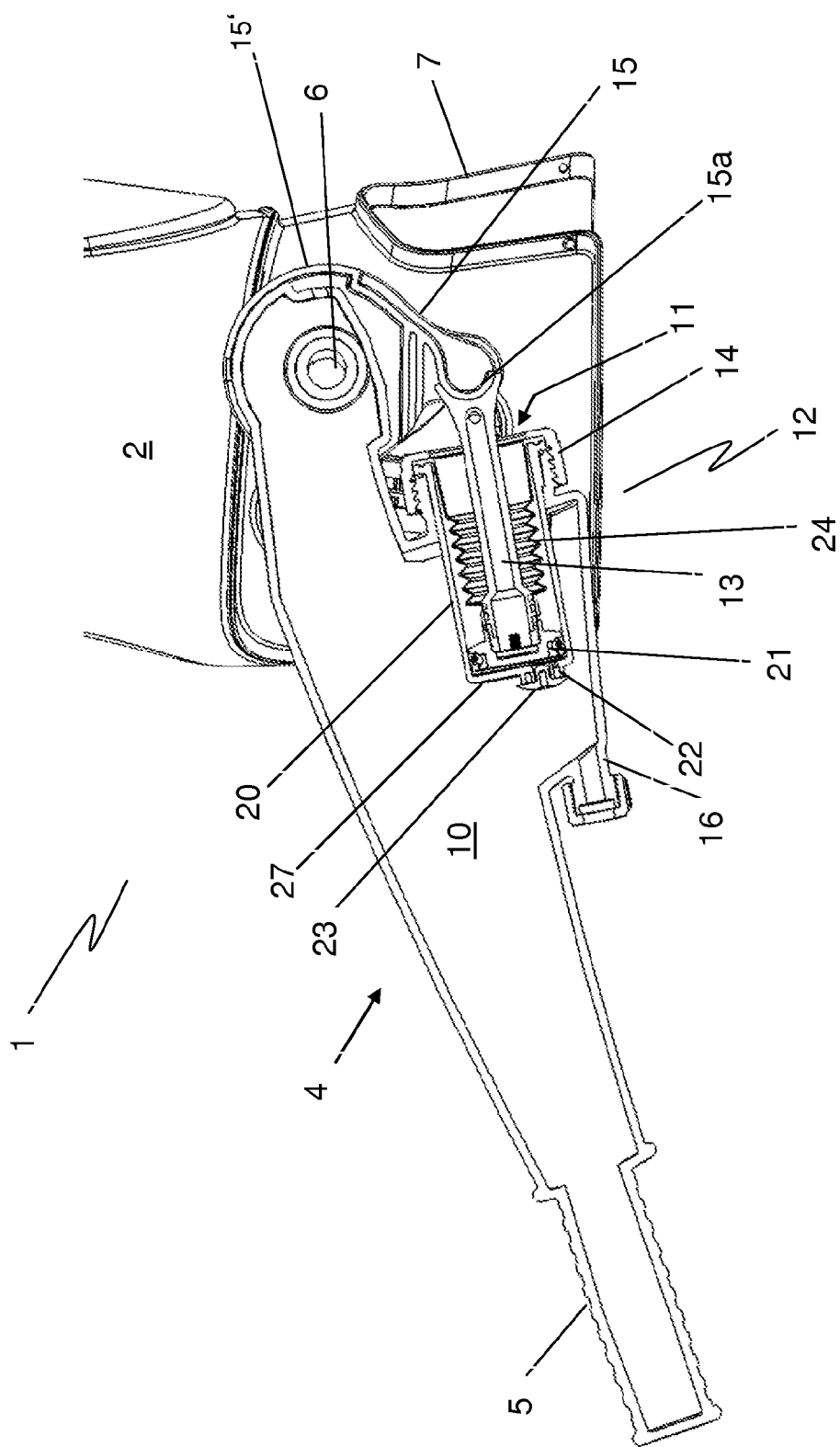
FIG. 2a shows a view of the hand lever in a longitudinal sectional view in a horizontal position.
Figure 2B:
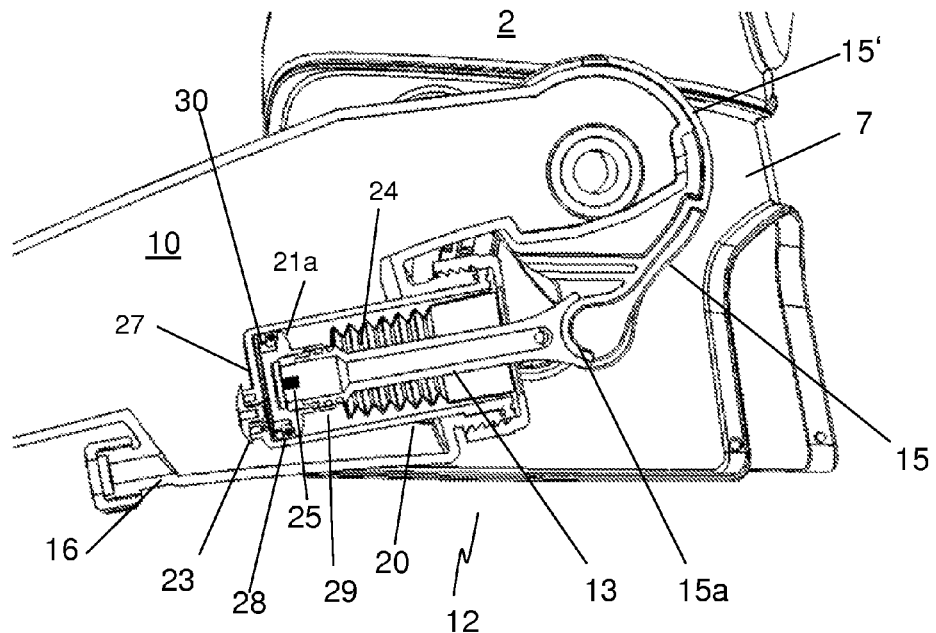
FIGS. 2b and 2c show a section of the view of FIG. 2a, especially the pump of the sprayer, whereof.
Figure 2C:
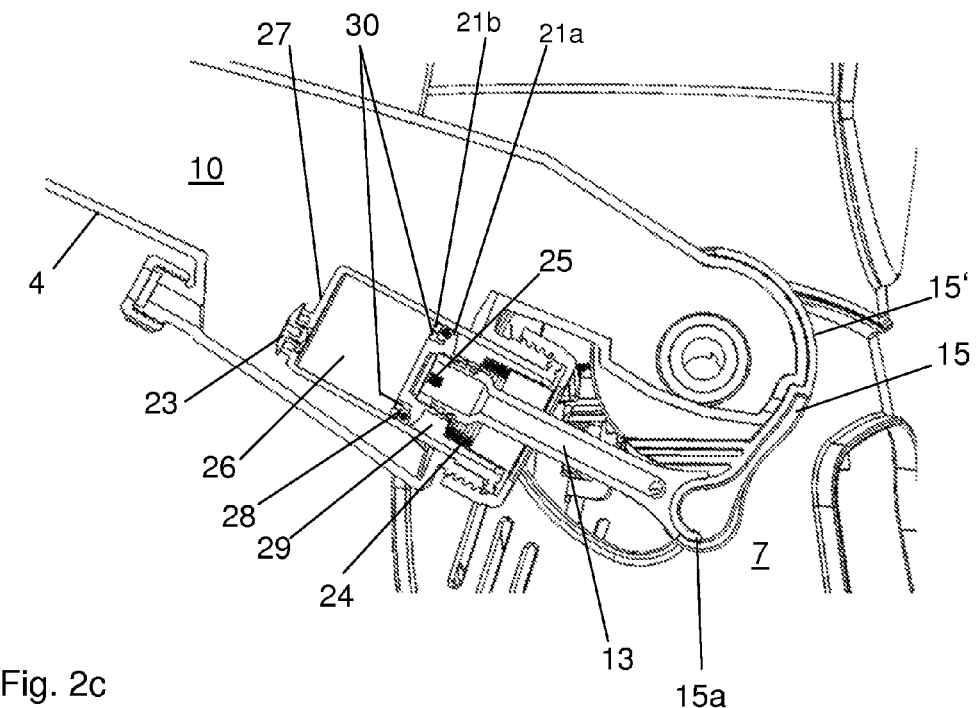
Figure 3:
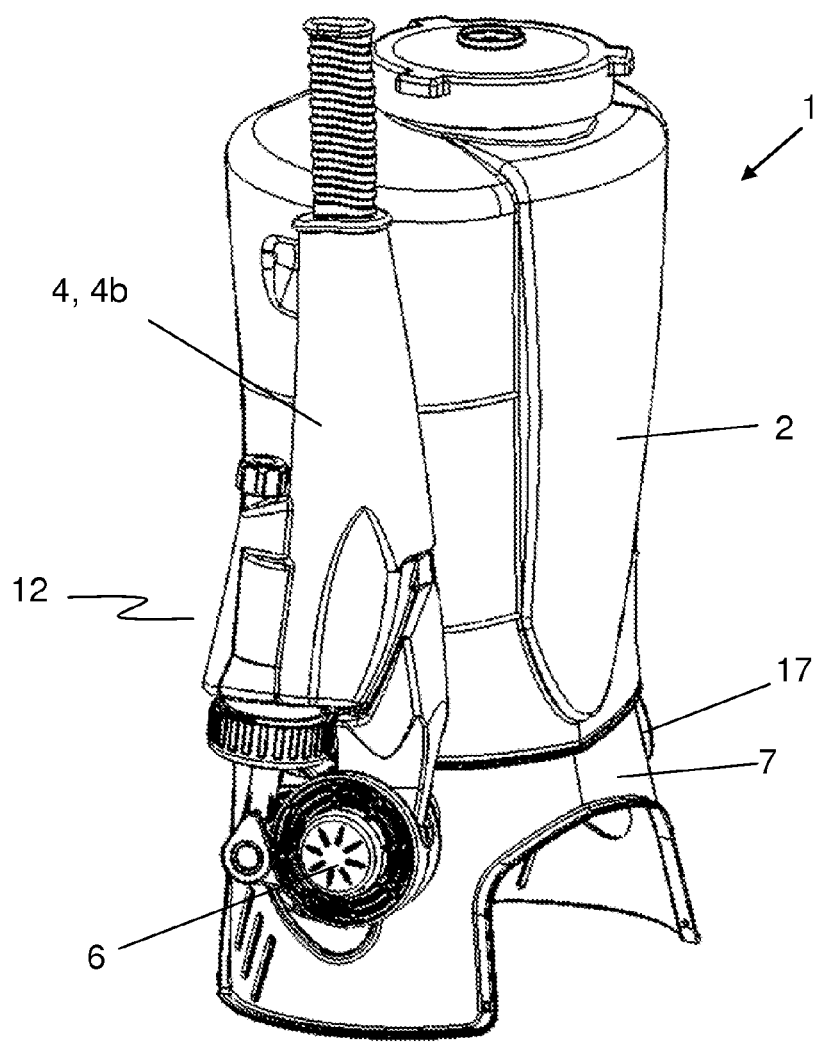
FIG. 3 shows a view of the portable sprayer in accordance with the invention with the hand lever in a vertical position.

The hand lever 4 can for example be moved upwardly about the hinge pin 6 starting from a horizontal position as shown in FIGS. 2a and 2b, wherein the pressure vessel 10 is moved together with the pump cylinder 20 in the upward direction to a higher position (FIG. 2c). The piston rod 13 fixed to the element 15 merely moves in form of a rotation about the link joint 15a. This leads to a movement of the pump cylinder 20 relative to the piston 21 in a direction away from the link joint 15a, while the piston 21 performs the rotational movement about the rotational axis of the link joint 15a. A cylinder space 26 is thus formed between the cylinder end 27 and the piston 21, wherein a buffer space 29 between the piston 21 and the bellows 24 decreases in size (FIG. 2c). A negative pressure is formed in the cylinder space 26 between the piston 21 and the cylinder end 27, wherein the non-return valve 23 closes. During the first pumping movement, air flows from the still empty buffer space 29 into the cylinder space. If liquid is already present in the buffer space 29, said liquid moves from the buffer space 29 to the cylinder space 26. A freely movable O-ring 28 is situated between an inner piston lip 21a facing the piston rod 13 and an outer piston lip 21b facing the cylinder end 27. The O-ring 28 is pressed during the movement of the cylinder 20 away from the link joint 15a against the outer piston lip 21b by an inhibitory effect and the pressure difference between the spaces on either side of the piston 21, wherein said outer piston lip seals against the cylinder wall. The liquid from the buffer space 29 moves past the inner piston lip 21a and through a number of openings 30 in the outer piston lip 21b into the cylinder space 26.

In order to press the liquid sucked into the cylinder space 26 from there into the pressure vessel 10, the hand lever 4 is pressed downwardly again, wherein the pump cylinder 20 and the cylinder end 27 are moved towards the piston 13 and the cylinder space 26 decreases in size again. As a result of the movement of the pump cylinder 20 in the direction of the link joint 15a, the pressure rises in the cylinder space 26, the non-return valve 23 opens and liquid passes through the non-return valve 23 to the pressure vessel 10. In this process, the O-ring 28 is pressed against the inner piston ring 21a and seals against the inner piston lip 21a and the cylinder wall, so that no liquid can escape from the cylinder space 26 back to the buffer space 29.

At the same time, liquid is sucked in by formation of a negative pressure in the buffer space 29 from the tank 2 via the hollow piston rod 21 to its end on the piston 13, where it reaches the buffer space 29 through the openings 25 at this end of the piston rod 13. The liquid in the buffer space 29 thus reaches the space 26 during the next upward movement of the lever 4 and the cylinder 20.

The entire hand lever 4 can be removed with its hinge pin from the remainder of the device and can be fixed in a new position again. The hand lever 4 runs on a hinge pin 6 for example which is brought into the pedestal apparatus 7 in an insertion shaft. The two shafts are respectively fixed by a snap-on hook. This function is used on the one hand for fixing the lever in the vertical position 4b, wherein the device thus requires less space when stored. On the other hand, it allows the positioning of the lever in the vertical position as the starting position of operation, so that the movement for suction and pumping of the liquid is carried out starting from a vertical position. The pump can thus also be actuated in a convenient and simple way when the device is not carried on the back. The hand lever 4 can also be operated on the opposite side of the device.

The closure device 14 for closing and sealing the opening 11 of the hand lever is provided in the illustrated embodiment with a thread 14a, which allows the opening and/or removal of the pump for the purpose of its maintenance with minimal effort. The closure of the closure device on the body of the hand lever can also be realized by means of a snap lock.

LIST OF REFERENCE NUMERALS

1 Portable sprayer
2 Tank
3 Filler cap
4 Hand lever
5 Handle
6 Hinge pin
7 Pedestal apparatus
8, 9-
10 Hollow space
11 Opening
12 Pump
13 Connecting rod
14 Closure device, sealing closure
15 Lever element
15a Link joint
16 Connecting sleeve
17 Second connection for hand lever
18, 19-
20 Pump cylinder
21 Piston
21a Inner piston lip, facing piston rod 13
21b Outer piston lip, facing the cylinder end 27
22 Opening to the hollow space
23 Ball check valve
24 Bellows
25 Openings
27 Cylinder space
28 Cylinder end
28 O-ring
29 Cylinder space, buffer reservoir
30 Openings in the outer piston lip 21b

The invention claimed is:

1. A portable sprayer for spraying liquids, comprising a tank, a pump, a hand lever which is rotatable about a hinge pin for actuating the pump, a pressure vessel for receiving pressurized liquid, and a hose with a valve and a nozzle or a lance for spraying pressurized liquid from the hand lever, wherein the hand lever of the sprayer comprises a hollow space with an opening, wherein the pump is arranged with a pump cylinder, a piston and a piston rod in the hollow space, and the pump cylinder of the pump and the opening of the hand lever is closed in a sealing fashion, and the pressure vessel is formed by the hollow space and the tightly closed opening, and the piston rod is rotatably connected to the hinge pin of the hand lever via a lever element.

2. A portable sprayer according to claim 1, wherein the opening of the hollow space and the pump cylinder are tightly closed towards the outside by a removable closure device.

3. A portable sprayer according to claim 2, wherein the closing device is formed by a closure device with a thread or a snap lock.

4. A portable sprayer according to claim 1, wherein the hand lever is made of a lightweight or plastic material.

5. A portable sprayer according to claim 1, wherein the hand lever comprises a connecting sleeve for the hose, wherein the connecting sleeve is arranged as a part of the hand lever.

6. A portable sprayer according to claim 1, wherein the piston rod is formed having a hollow space and forms a suction line for the liquid from the tank to the pump cylinder.

7. A portable sprayer according to claim 1, wherein the pump comprises a bellows for static sealing to the outside.

8. A portable sprayer according to claim 1, wherein the pump comprises an opening to the hollow space of the hand lever, which opening is provided with a non-return valve.

9. A portable sprayer according to claim 1, wherein a non-return valve is arranged on the piston of the pump as a return flow barrier.

10. A portable sprayer according to claim 1, wherein the piston of the pump comprises an inner piston lip and an outer piston lip, and a freely movable O-ring is arranged between the inner piston lip and the outer piston lip.

11. A portable sprayer according to claim 1, wherein the entire hand lever can be removed from the hinge pin for the purpose of actuating the hand lever from a horizontal starting position and also a vertical starting position, and can be fixed in a horizontal position as well as in a vertical position, parallel to the tank.

12. A portable sprayer according to claim 1, wherein the hinge pin is fixed by means of a snap-on hook to the pedestal apparatus.

* * * * *